Dec. 17, 1963    R. E. HOUSE    3,114,437
BRAKE ASSEMBLY
Filed March 21, 1957
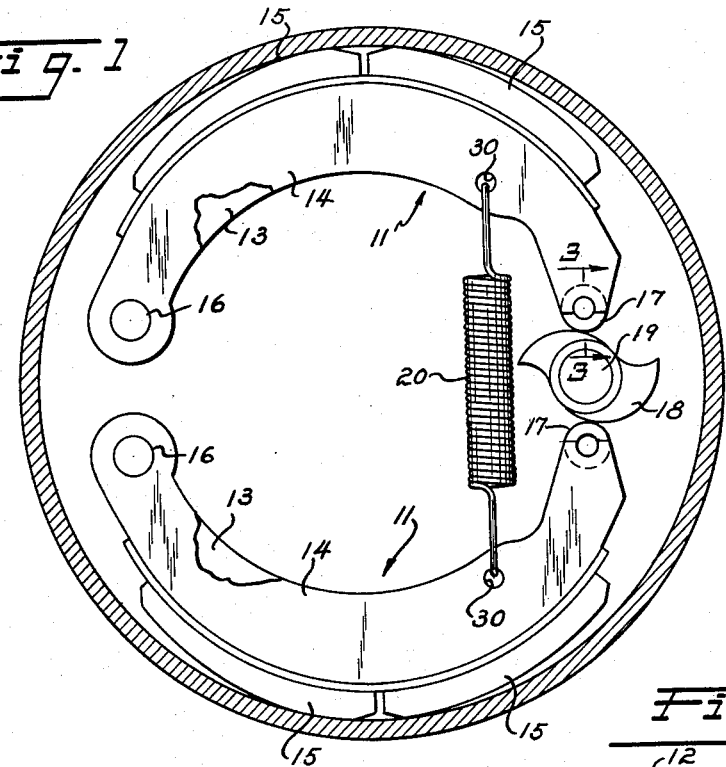
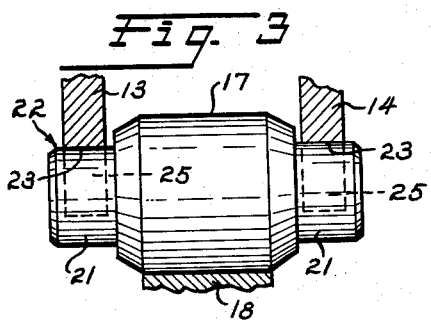
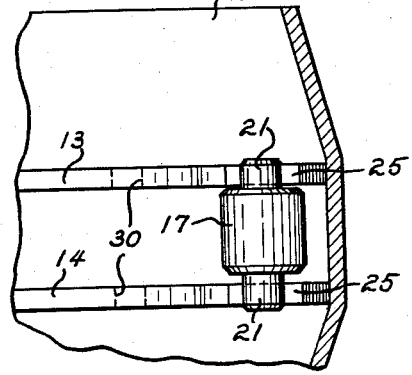
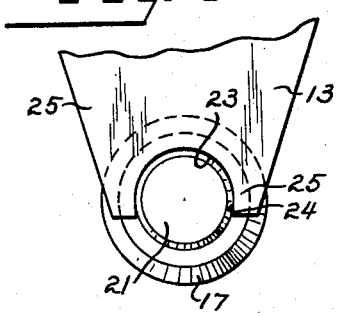
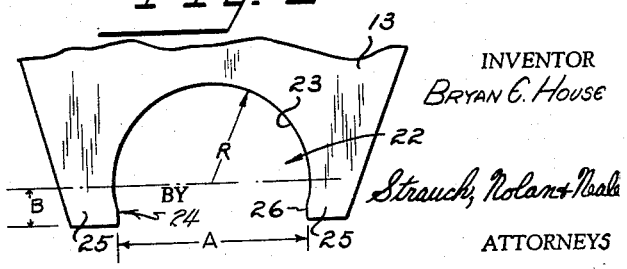
INVENTOR
BRYAN E. HOUSE
Strauch, Nolan + Neale
ATTORNEYS

United States Patent Office 3,114,437
Patented Dec. 17, 1963

3,114,437
BRAKE ASSEMBLY
Bryan E. House, Ashtabula, Ohio, assignor to Rockwell-Standard Corporation, a corporation of Pennsylvania
Filed Mar. 21, 1957, Ser. No. 647,707
2 Claims. (Cl. 188—78)

This invention relates to brakes for vehicles and is particularly concerned with a special manner of mounting cam follower rollers rotatably on the brake shoes.

According to the preferred embodiment of the invention the brake shoe web ends are formed with open bearing recesses which are adapted to admit, retain and journal the cam follower roller shaft without providing complex retainers or additional elements.

It is the major object of the invention to provide a novel snap-in mounting for a brake shoe cam follower roller.

A further object of the invention is to provide a dual web brake shoe construction wherein novel open ended recesses are formed in the web ends adjacent the brake cam, these recesses each having a substantially semi-circular roller shaft journal portion and an integral resilient mouth that is normally sufficiently small to normally retain the cam follower roller shaft in said recesses but may be expanded during insertion or removal of the roller from thet brake shoe sufficiently to admit or permit withdrawal of the cam follower roller shaft relative to the journal portions of the recesses.

Further objects of the invention will appear as the description proceeds in connection with the appended claims and the annexed drawings wherein:

FIGURE 1 is a side elevation of a brake assembly with each shoe having a cam follower roller mounted thereon in accord with a preferred embodiment of the invention;

FIGURE 2 is a fragmentary end view of one brake shoe showing the roller in the shoe web;

FIGURE 3 is a section on line 3—3 of FIGURE 1 further showing the cam follower roller mounting;

FIGURE 4 is an enlarged fragmentary side view of the mounted cam follower roller; and FIGURE 5 is an enlarged side view of a shoe web recess.

FIGURE 1 shows brake shoes 11 each having an arcuate platform 12 and integral parallel flat webs 13 and 14 that extend substantially the length of the platform. Suitable brake blocks 15 of friction material are fixed on the platform. At one end the webs of each shoe are formed with coaxial bores 16 by which the shoe is pivoted on a suitable support. At the opposite end the webs of each shoe rotatably mount cylindrically a cam follower roller 17 which coacts with a suitable cam 18 rotatable on a fixed axis at 19. In the brake assembly the two shoes 11 are similarly pivoted and carry similar cam follower rollers 17 at the opposite sides of the cam 18 and are urged in opposite directions by a suitable return spring assembly 20 hooked into holes 30 which pulls the rollers 17 into surface engagement with cam 18.

The invention concerns the mounting of rollers 17 on the shoe web ends and this is the same in both shoes.

Each cam follower roller 17 is cylindrical as stated above, and formed at opposite ends with coaxial identical cylindrical reduced diameter shaft sections or trunnions 21. Each shoe web 13 and 14 is formed with an identical open end recess indicated at 22 for seating and retaining the roller trunnion 21.

Referring to FIGURE 5, each recess 22 comprises a journal portion 23 and a resilient transverse mouth portion 24. The journal portion comprises a web edge surface that describes a semi-circular arc of radius R. Extending beyond the ends of journal surface 23 and past the centerline of the roller shaft 21 are identical integral web terminal portions 25 having opposed inner surfaces 26 that are spaced by the distance A. This distance A is slightly less than the diameter of the journal portion 23.

One practical way to fabricate this construction is to form the web ends, as by broaching, with the 180° extent curved journal recess portions 23, and with surfaces 26 on extensions 25 extending straight from the ends of the semicircular recess parallel to each other and approximately tangent to the curvature of the journal surface. These extensions have a predetermined length as indicated at B in the drawing. Then the extensions 25 are deformed toward each other to form a contracted recess mouth of the dimension A.

The cam follower roller shaft 21 is smooth and surface polished. In brakes in satisfactory service where the diameter of shaft 21 is about 0.75 inch the diameter of journal 23 is such as to provide a good rotatable bearing fit with the shaft 21, the dimension B is about 3/32" to 5/32" and the dimension A is made about 0.015" to 0.025" smaller than the diameter of shaft 21. The shoe webs are made of steel and after inward deformation of the extensions 25 to define the resilient mouth, the extensions and the adjacent web area are flame hardened to about Rockwell C-35 to C-45 to increase the springiness of the metal at these web ends. Preferably at least the end portions of surfaces 26 are parallel as illustrated.

In assembling the brake, the cam follower roll shaft sections 21 are placed in position over the respective recesses 22 with roller 17 located between the webs and inward pressure exerted on roller 17. Th cylindrical shaft sections 21 will cam the spring extension 25 apart sufficiently to enable the shaft sections to pass into the journal portions 23, and then the extensions will spring back to normal position where they are slightly spaced from the shaft surfaces so as not to bind any free rotation of roller 17 but are sufficiently close as to prevent the shafts form leaving the journal portions of the recesses unless a deliberate removal force is exerted to again spring the extensions apart.

It will be seen that the rollers may be made a part of the shoe assembly for shipping and inventory and thus reduce handling expenses.

In the operative brake assembly of FIGURE 1 the shafts 21 will tend to seat only within the journal areas 23 due to the pull of the shoes toward the cam 18 by spring 20, so that there is little or no tendency for the shafts 21 to have other than good bearing seating on the web ends.

In assembly and dismantling brakes made according to the invention, the above described retention of the cam follower rollers in the shoe web ends has proved to be advantageous in reducing service and assembly costs, no special parts such as retainer spring or clips are needed, and there is no danger of accidentally dropping and losing the relatively small cam follower roller, so speed and efficiency are improved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake assembly, a pair of brake shoes pivoted at adjacent ends, a rotatable cam disposed between the other ends of said shoes, said shoes each having arcuate bearing means at said other ends thereof providing a pair of spaced arcuate bearing surfaces in axial alignment, a trunnion roller means for each brake shoe including axially spaced cylindrical shaft means of substantially equal radius to the bearing means supported for rocking movement respectively on the bearing surfaces of its respective brake shoe and an intermediate roller engageable with the cam, said arcuate bearing surfaces extending through an arc of no less than 180° from end to end, and spring retainer means for said trunnion roller means comprising integral shoe extension portions at the opposite ends of said arcuate bearing surfaces defining a mouth having an effective opening sufficiently less than the diameter of said shaft means and of such inherent resiliency as to be forced apart by pressure of said shaft means at said mouth for insertion into said bearing means and being capable of springing back to retain said shaft means but permitting free rocking movement thereof in said arcuate bearing means when said roller trunnion means is fully inserted.

2. In combination, a brake shoe having a dual web structure, said webs being formed with similar and laterally aligned open ended recesses each of which consists of an inner arcuate bearing surface and a resilient spring retainer mouth portion, and a cam follower roller unit having a roller intermediate the webs and axially rigid opposed cylindrical trunnions of the same diameter supported for rocking movement on said bearing surfaces and retained by said mouth, said mouth being formed by integral shoe portions at the opposite ends of said arcuate bearing surfaces having an effective spacing substantially less than the diameter of said trunnions, said integral shoe portions being of such inherent resiliency as to be forced apart by pressure of said trunnions at said mouth for insertion into said recess and being capable of springing back to retain said trunnions but permitting free rocking movement thereof on said arcuate bearing surface when said trunnions are fully inserted.

References Cited in the file of this patent
UNITED STATES PATENTS

| | | |
|---|---|---|
| Re. 17,688 | Evans | June 3, 1930 |
| 2,435,727 | Spencer | Feb. 10, 1948 |
| 2,710,076 | Russell | June 7, 1955 |
| 2,781,868 | House | Feb. 19, 1957 |